United States Patent
Torii

(10) Patent No.: US 8,339,710 B2
(45) Date of Patent: Dec. 25, 2012

(54) HEAD UP DISPLAY DEVICE

(75) Inventor: Kouichirou Torii, Kariya (JP)

(73) Assignee: Denso Corporation, Kariya (JP)

( * ) Notice: Subject to any disclaimer, the term of this patent is extended or adjusted under 35 U.S.C. 154(b) by 28 days.

(21) Appl. No.: 13/065,441

(22) Filed: Mar. 22, 2011

(65) Prior Publication Data

US 2011/0242669 A1    Oct. 6, 2011

(30) Foreign Application Priority Data

Mar. 30, 2010  (JP) ................................. 2010-079097

(51) Int. Cl.
G02B 27/14 (2006.01)
G03H 1/00 (2006.01)
G03B 21/26 (2006.01)
G08B 5/36 (2006.01)

(52) U.S. Cl. ........ 359/633; 359/13; 353/28; 340/815.74

(58) Field of Classification Search .......... 359/630–634, 359/13–14; 310/49 R, 156.32, 156.33, 156.34, 310/266, 267, 268, 156.35, 156.36, 156.02; 353/11–12, 28, 119; 340/438, 980, 995.1, 340/815.47, 815.74

See application file for complete search history.

(56) References Cited

U.S. PATENT DOCUMENTS

2004/0183750 A1  9/2004  Nagano et al.
2006/0163953 A1*  7/2006  Kawamoto et al. ......... 310/49 R

FOREIGN PATENT DOCUMENTS

| JP | 8-2287 | 1/1996 |
| JP | 08-019297 | 1/1996 |
| JP | 2006-158019 | 6/2006 |

OTHER PUBLICATIONS

Office Action issued in corresponding JP Application No. 2010-079097 dated Jun. 15, 2012 with English translation thereof.

* cited by examiner

*Primary Examiner* — Dawayne A Pinkney

(74) *Attorney, Agent, or Firm* — Harness, Dickey & Pierce, PLC

(57) ABSTRACT

A head up display device for a vehicle, includes a display, a reflective member, a stepping motor, and a control part. The reflective member reflects an image displayed by the display and projects the image onto a projection member, thereby displaying a virtual image. The stepping motor rotates the reflective member to adjust a display position of the virtual image. A stabilization point, at which detent torque of the stepping motor is maximized, is defined as a target rotation angle of a magnet rotor. The control part performs normal rotation control that controls amplitude of a drive signal to rotate the magnet rotor to the target rotation angle. After the control part performs the normal rotation control, the control part performs application continuation control that continues application of the drive signal for a predetermined period, with the amplitude of the drive signal at the target rotation angle being maintained.

1 Claim, 8 Drawing Sheets

HEAD UP DISPLAY DEVICE

CROSS REFERENCE TO RELATED APPLICATION

This application is based on and incorporates herein by reference Japanese Patent Application No. 2010-79097 filed on Mar. 30, 2010.

BACKGROUND OF THE INVENTION

1. Field of the Invention

The present invention relates generally to a head up display device, and more particularly to a head up display device that is suitable to be disposed in a vehicle.

2. Description of Related Art

Conventionally, as an example of a head up display device (hereinafter referred to as an HUD device), there is an HUD device for a vehicle described in JP-A-H08-002287. The HUD device for the vehicle displays a virtual image at a desired position for a user'(driver). The HUD device for the vehicle includes a display unit having a display that displays an image, and a reflective member that reflects the image displayed on the display to project the image onto a projection member provided for the vehicle, such as a windshield. The image projected on the windshield from the display unit is displayed as a virtual image.

This HUD device includes a stepping motor that changes a projection position of the image on the windshield by rotating the reflective member to change a display position of the virtual image. This stepping motor is rotated through the operation of an operating switch by the driver. Accordingly, the virtual image can be displayed at the driver's favorite position.

The stepping motor used for the HUD device rotates a magnet rotor by the application of a drive signal whose amplitude periodically changes to a coil. This application of the drive signal is carried out in accordance with a step signal outputted from an oscillator. The oscillator outputs a step signal when a forward signal or reverse signal from the operating switch is inputted thereinto.

Generally, in a stepping motor that employs a magnet rotor for a rotor, it is noted that the magnet rotor is held at a stabilizing point at which detent torque becomes the greatest. By maintaining a rotation angle of the magnet rotor using the detent torque as above, waste of consumed electric power of the stepping motor can be curbed as much as possible.

However, if a size of a stator for fixing the coil of the stepping motor, or a magnetizing position of a magnetic pole of the magnet rotor varies, an actual stabilizing point of the magnet rotor and a quiescent point of the magnet rotor at the time of application of the drive signal to the coil become different. Accordingly, if the application of the drive signal to the coil is stopped to limit the waste of the consumed electric power of the motor, the magnet rotor rotates by a minute angle, and the virtual image thereby vibrates.

When changing the display position of the virtual image, the user (driver) raises awareness of a display state of the virtual image, and is sensitive to a slight movement of the virtual image. Accordingly, if the virtual image vibrates immediately after the completion of rotation of the reflective member, i.e., while the user's awareness of the display state of the virtual image is being heightened, a sense of discomfort may be brought to the user.

SUMMARY OF THE INVENTION

The present invention addresses at least one of the above disadvantages.

According to the present invention, there is provided a head up display device for a vehicle, including a display, a reflective member, a stepping motor, and a control part. The display is configured to display an image. The reflective member is disposed rotatably relative to the display and configured to reflect the image displayed by the display and to project the image onto a projection member of the vehicle, thereby displaying a virtual image of vehicle-related information. The stepping motor is configured to rotate the reflective member so as to adjust a display position of the virtual image. The stepping motor includes a coil, a stator, and a magnet rotor accommodated rotatably in the stator. The magnet rotor is rotated as a result of application of a drive signal, whose amplitude periodically changes, to the coil. The reflective member is rotated by the rotated magnet rotor. A stabilization point, at which detent torque of the stepping motor is maximized, is defined as a target rotation angle of the magnet rotor. The control part is configured to perform normal rotation control that controls the amplitude of the drive signal to rotate the magnet rotor to the target rotation angle. After the control part performs the normal rotation control to rotate the magnet rotor to the target rotation angle, the control part performs application continuation control that continues the application of the drive signal for a predetermined period, with the amplitude of the drive signal at the target rotation angle being maintained.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
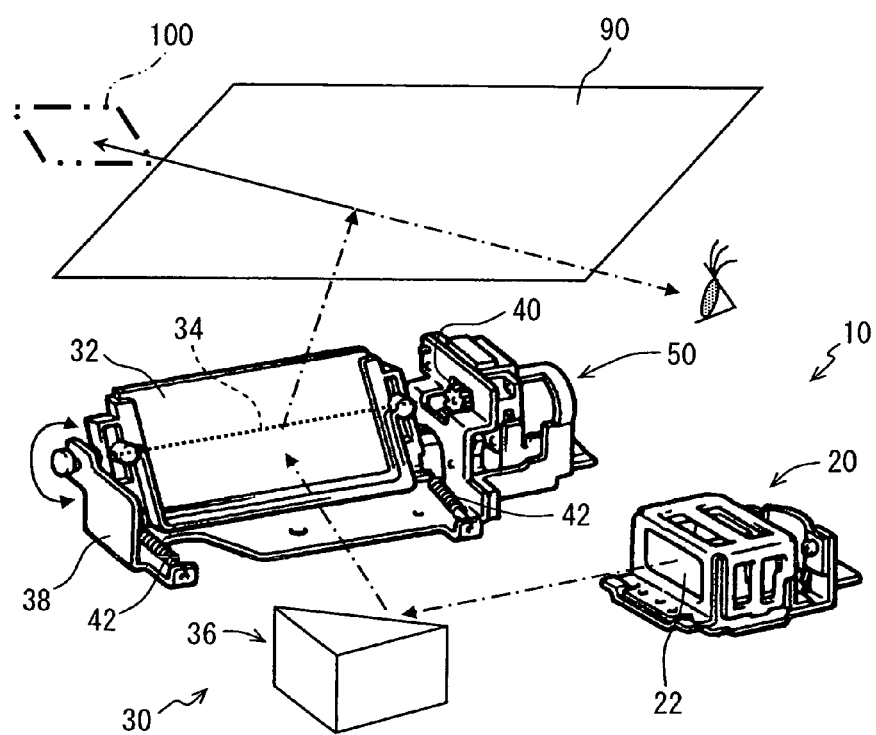
FIG. 1 is a diagram roughly illustrating a configuration of an HUD device in accordance with a first embodiment of the invention.

Embodiments of the invention will be described below with reference to the accompanying drawings. By using the same numerals to indicate corresponding components in the embodiments, repeated explanations are omitted.

First Embodiment

A basic configuration of an HUD device 10 for a vehicle will be described. The HUD device 10, which is disposed in the vehicle, includes a display 20, an optical system 30, a stepping motor 50, an operating switch 70, and a control system 80.

The display 20, the optical system 30, and the stepping motor 50 of the HUD device 10 are accommodated and fixed in a housing (not shown), and arranged in an instrument panel of the vehicle. The housing includes a translucent radiation window at its portion that is vertically opposed to a windshield 90 which is fixed to a part of the vehicle in front of a driver's seat and which serves as a projection member.

In the present embodiment, the display 20 is a transmitted illumination type liquid crystal panel, and includes a screen on which to display an image. A screen 22 is transmissively illuminated with a built-in back light (not shown) of the display 20, so that the display 20 displays the image. In the present embodiment, an image that indicates a traveling direction instruction calculated in a navigation device is displayed on the screen 22 (see FIG. 3). Other vehicle-related information can be displayed for the image displayed on the screen 22. For example, an image indicating vehicular information, such as traveling speed information or remaining fuel information of the vehicle, or coolant temperature information of the vehicle, may be employed.

The optical system 30 includes a concave mirror 32 and a reflecting mirror 36 which serve as a reflective member. While the optical system 30 is constituted of the two mirrors in the present embodiment, the optical system 30 may be composed only of the concave mirror 32, or there may be more than one reflecting mirror 36. The optical system 30 projects the image displayed on the display 20 onto a predetermined position of the windshield 90 of the vehicle. By means of such a projection of the image, the image is formed in the front of the windshield 90 and displayed toward the driver's seat in a passenger compartment as a virtual image. Accordingly, the driver seated on the driver's seat visually identifies the image displayed at an image formation position in front as a virtual image 100. Although the image is projected on the windshield 90 in the present embodiment, the image may be projected on a combiner which is different from the windshield 90.

Figure 3:
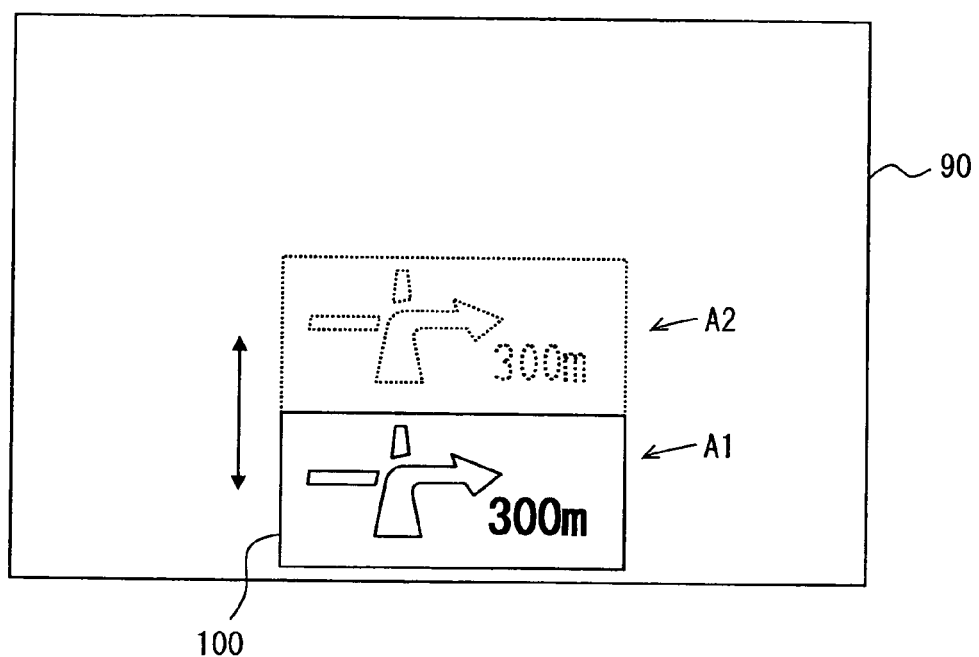
FIG. 3 is a schematic view illustrating a display example in the HUD device in accordance with the first embodiment.

As illustrated in FIG. 1, the concave mirror 32 is held rotatably by a holding member 38. The concave mirror 32 includes a rotatable shaft 34 which is held rotatably by the holding member 38. As a result of the rotation of the rotatable shaft 34, the concave mirror 32 changes a display position of the virtual image 100 in the vertical direction relative to the windshield 90, as illustrated in FIG. 3, in accordance with a rotation angle of the concave mirror 32. In the present embodiment, the display position of the virtual image 100 is variable between a display, position A1 (lower limit position in a movable region) and a display position A2 (upper limit position in the movable region).

The rotatable shaft 34 is mechanically coupled with an output shaft 64 of the stepping motor 50, and rotated in accordance with rotation (forward rotation or reverse rotation) of the output shaft 64. The output shaft 64 and the rotatable shaft 34 are coupled through a gear 40. A spring member 42 for absorbing a backlash between a motor-side gear and a concave mirror-side gear is provided between the concave mirror 32 and the holding members 38. Rotary torque by urging force of the spring member 42 is applied to a magnet rotor 60 of the stepping motor 50 via the gear 40.

Figure 2:
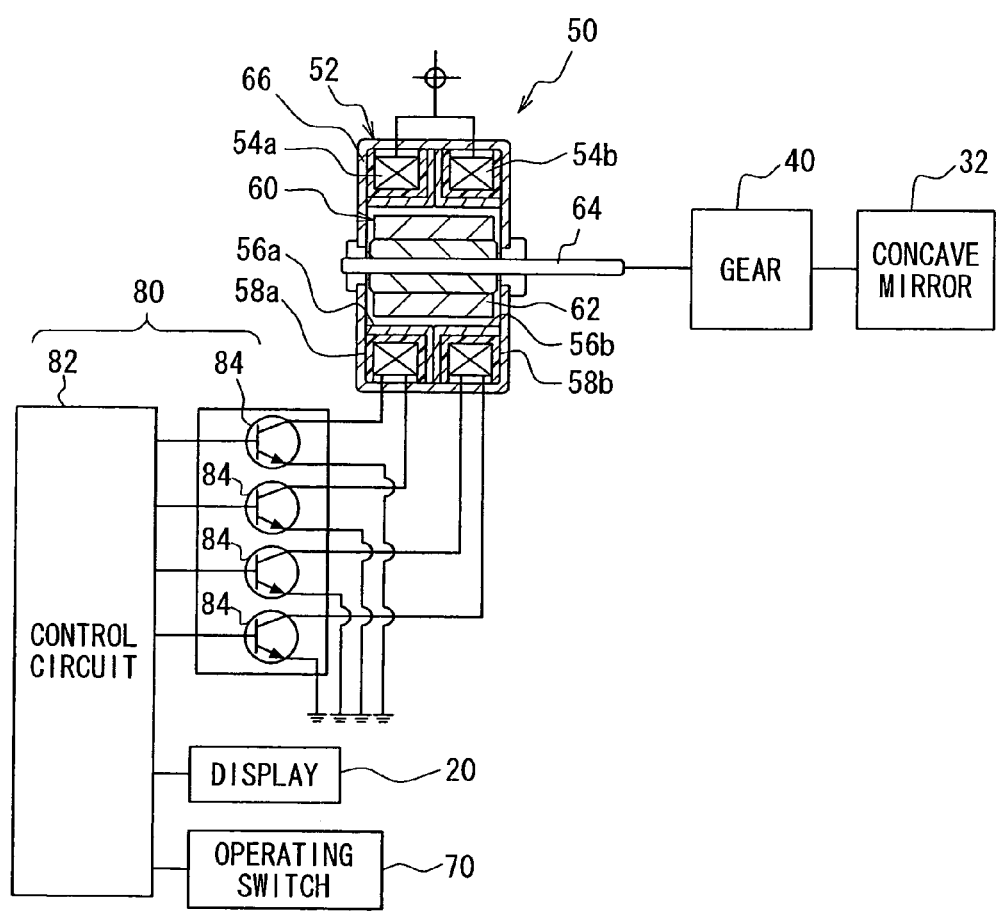
FIG. 2 is a diagram illustrating a general configuration of a stepping motor in the HUD device and a connecting condition of a control system in accordance with the first embodiment.

As illustrated in FIG. 2, the stepping motor 50 employed in the present embodiment is of a permanent-magnet type having a claw pole structure, and includes exciting coils 54a, 54b fixed to a stator 52, and the magnet rotor 60. The stator 52 is obtained as a result of the combination of a claw pole yoke 56a and the pair of exciting coils 54a which form phase A, and a claw pole yoke 56b and the pair of exciting coils 54b which form phase B. The exciting coils 54a, 54b are obtained respectively by winding two electric wires simultaneously around bobbins 58a, 58b, and referred to generally as bifilar wound coils.

The claw poles of the yokes 56a, 56b are arranged so as to be shifted by ½ pitch by the mechanical angle. The magnet rotor 60 is obtained by attaching a magnet 62 radially outward of the output shaft 64. The magnet rotor 60 is held by a motor housing 66 rotatably relative to the stator 52.

The stepping motor 50 having the above-described configuration generates a rotating magnetic field by the excitation of the coils 54a, 54b of the exciting coils 54a, 54b of respective phases A, B receiving a drive signal. Due to this generation of the rotating magnetic field, rotary torque is generated in the magnet rotor 60. This rotary torque is transmitted to the rotatable shaft 34 of the concave mirror 32 through the output shaft 64 of the magnet rotor 60 and the gear 40. The drive signals applied to the exciting coils 54a, 54b of the present embodiment are signals whose amplitudes periodically change, and the signal takes the shape of a rectangular wave (see FIGS. 5 and 6).

The stepping motor 50 of the present embodiment generates detent torque in the output shaft 64 of the magnet rotor 60 through the interaction between these yokes 56a, 56b and the magnet 62 of the magnet rotor 60, even in a non-magnetized state where the drive signal is not applied to any exciting coils 54a, 54b. In the non-magnetized state, the magnet rotor 60 becomes static at a stabilizing point at which the detent torque becomes the greatest.

As illustrated in FIGS. 1 and 2, the operating switch 70 is disposed so as to be pressed by the driver on the driver's seat in the vehicle. The operating switch 70 of the present embodiment includes an up-switch that produces an upward command signal for moving the display position of the virtual image 100 in the upper direction, and a down-switch that produces an downward command signal for moving the display position of the virtual image 100 in the lower direction. In the present embodiment, the driver presses the up-switch to turn on the up-switch, so that the upward command signal is outputted from the operating switch 70; and by the depression of the down-switch, the downward command signal is outputted from the operating switch 70. These command signals are outputted as long as each switch is pressed. When the depression of each switch is canceled, the output of each command signal stops.

As illustrated in FIG. 2, the control system 80 serving as a control part is obtained as a result of the combination of a control circuit 82 and switching elements 84, and disposed inside or outside a case. In the present embodiment, the control circuit 82 is configured using mainly a microcomputer, and electrically connected to the display 20 and the operating switch 70. In the present embodiment, each switching element 84 is a transistor whose collector is connected to either one of the exciting coils 54a, 54b. An emitter and base of the transistor are connected respectively to the ground (not shown) and the control circuit 82. Each switching element 84 changes the amplitudes of the drive signals applied to the exciting coils 54a, 54b of respective phases A, B in accordance with a gate signal inputted from the control circuit 82. Accordingly, in the following description, the control of the gate signal to the switching element 84 by the control circuit 82 will be explained as the control of the drive signals to the exciting coils 54a, 54b.

In the control system 80 having the above-described configuration, the control circuit 82 controls the display of the image by the display 20. As well, the control circuit 82 controls the drive signals to the exciting coils 54a, 54b of respective phases A, B based on the command signal inputted from the operating switch 70. Specifically, in accordance with the upward command signal, the control circuit 82 changes the display position of the virtual image 100 in the upper direction through the control of the amplitudes of the drive signals applied to the exciting coils 54a, 54b of respective phases such that the concave mirror 32 is forward rotated together with the stepping motor 50. In accordance with the downward command signal, the control circuit 82 changes the display position of the virtual image 100 in the lower direction through the control of the amplitudes of the drive signals applied to the exciting coils 54a, 54b of respective phases such that the concave mirror 32 is reverse rotated together with the stepping motor 50.

Figure 5:
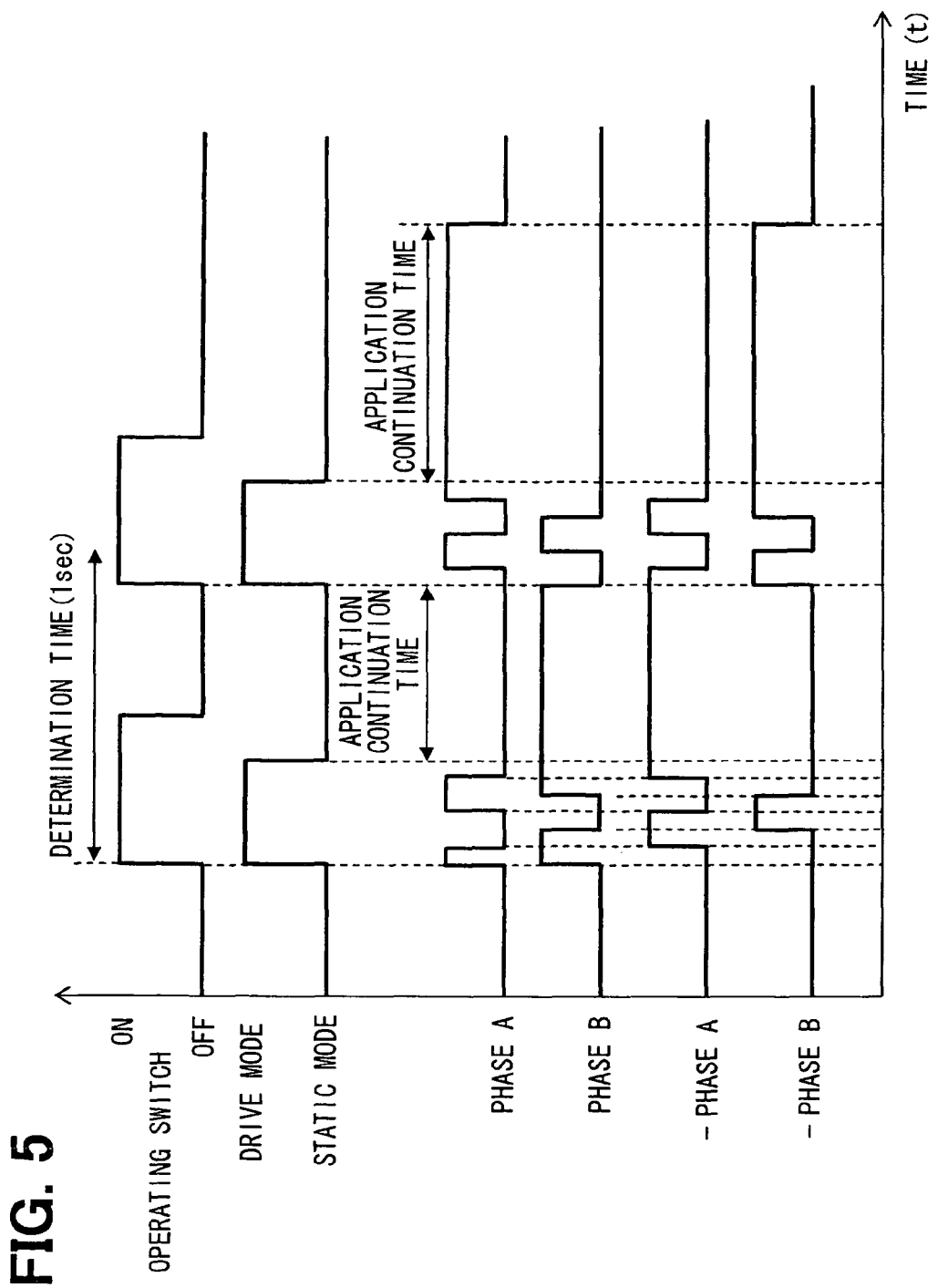
FIG. 5 is a timing diagram illustrating a drive pattern of the stepping motor when an operating switch is momentarily pressed in accordance with the first embodiment.
Figure 6:
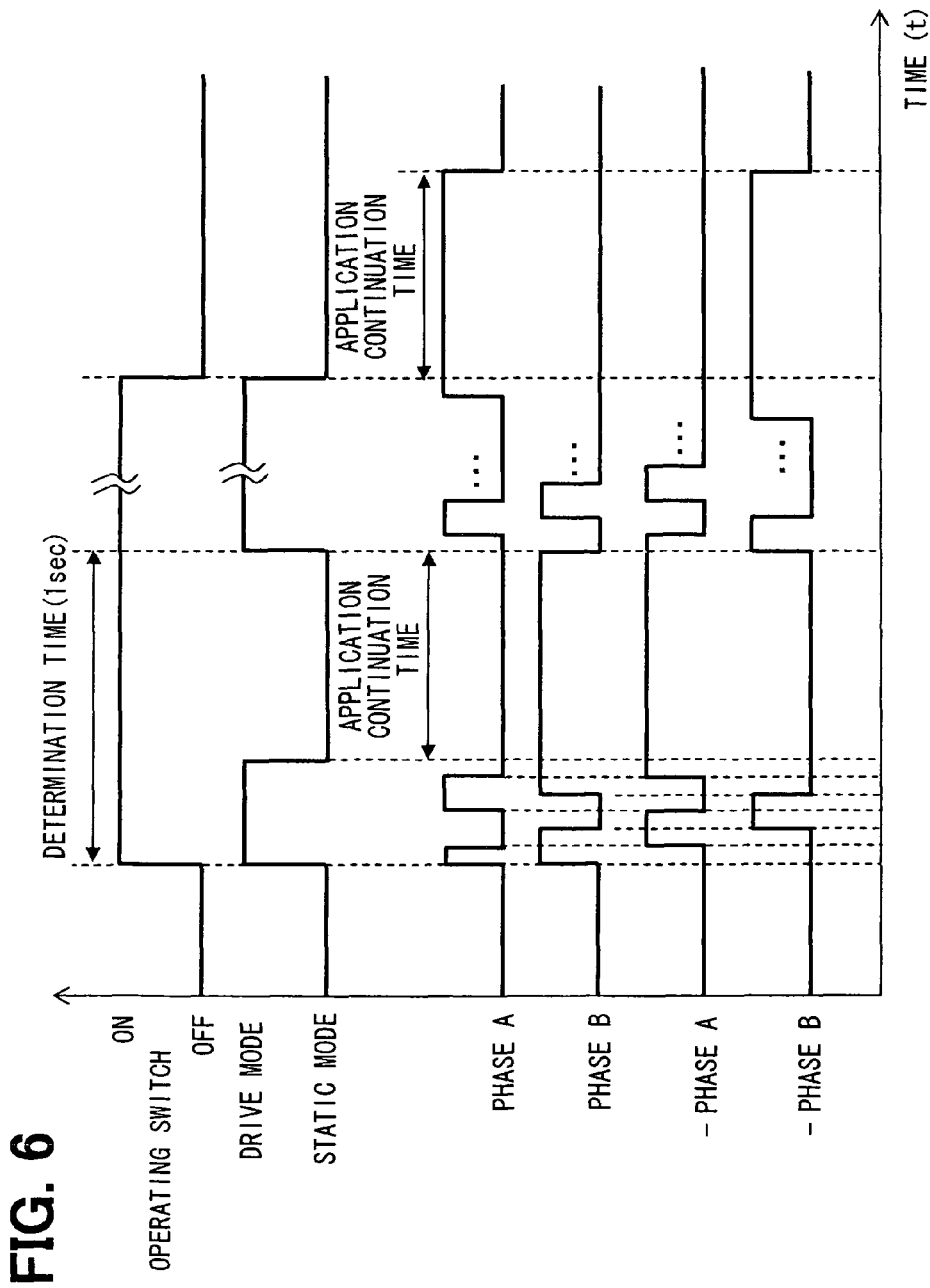
FIG. 6 is a timing diagram illustrating the drive pattern of the stepping motor when the operating switch is pressed for a long time in accordance with the first embodiment.

Characterizing portions of the HUD device 10 will be described. In the present embodiment, as illustrated in FIGS. 5 and 6, a two-phase excitation method is employed for the excitation method of the HUD device 10. As in FIGS. 5 and 6, the drive signal to each phase when the control circuit 82 is switching to a drive mode takes the shape of a rectangular wave. A phase difference between phase A and—phase A is 180 degrees by the electrical angle, and a phase difference between phase B and—phase B is 180 degrees by the electrical angle. In addition, a phase difference between phase A and phase B is 90 degrees by the electrical angle.

In the stepping motor 50 of the present embodiment, the control circuit 82 employs a full-step drive system as the drive system for the stepping motor 50. The full-step drive system is a drive system whereby the amplitude of the drive signal is changed from the present stabilizing point of the magnet rotor 60 to the adjacent next stabilizing point. More specifically, in the full-step drive system of the present embodiment, the control circuit 82 sets the above stabilizing point as a target rotation angle of the magnet rotor 60 to control the application of the drive signal to the exciting coils 54a, 54b. In the present embodiment, a voltage signal is used as the drive signal. Needless to say, the drive signal may be a current signal.

A quiescent point of the magnet rotor 60 in a magnetized state in which the exciting coils 54a, 54b are excited, and the stabilizing point of the magnet rotor 60 when the exciting coils 54a, 54b are in the non-magnetized state, coincide theoretically with each other, in a state in which a load is not coupled with the magnet rotor 60. Accordingly, even if the control circuit 82 applies the drive signal to the exciting coils 54a, 54b to excite the exciting coils 54a, 54b, and puts the exciting coils 54a, 54b of respective phases into the non-magnetized state after the magnet rotor 60 is stopped, the rotation angle (mechanical angle) of the magnet rotor 60 is not changed.

However, if sizes of the stator 52 and the claw pole yokes 56a, 56b of the stepping motor 50, or a magnetizing position of a magnetic pole of the magnet 62 in the magnet rotor 60 vary, an actual stabilizing point of the magnet rotor 60 in the non-magnetized state, and the quiescent point of the magnet rotor 60 at the time of application of the drive signal to the exciting coils 54a, 54b are different. Accordingly, if the application of the drive signal to the coil is stopped to limit waste of the consumed electric power of the motor, the magnet rotor is rotated by a minute angle, and the virtual image thereby vibrates. This vibration of the virtual image is caused immediately after the magnet rotor reaches the target rotation angle.

This difference between the stabilizing point and the quiescent point is caused also due to the urging force of the spring member 42. When the control circuit 82 stops the application of the drive signal to the exciting coils 54a, 54b to put the coils 54a, 54b, into the non-magnetized state, the magnet rotor 60 is rotated only to the extent that loss of synchronism is not caused under the influence of the urging force of the spring member 42, and becomes static at a position at which the urging force of the spring member 42 and the detent torque balance out. In this case, the position where the urging force and detent torque equal out becomes the stabilizing point of the stepping motor 50.

When changing the display position of the virtual image 100, the driver raises his/her awareness of a display state of the virtual image 100, and is sensitive to a slight movement of the virtual image 100. Accordingly, if the virtual image 100 moves immediately after the completion of rotation of the concave mirror 32, i.e., while the driver's awareness of the display state of the virtual image 100 is being heightened, a sense of discomfort may be given to the driver.

Figure 4:
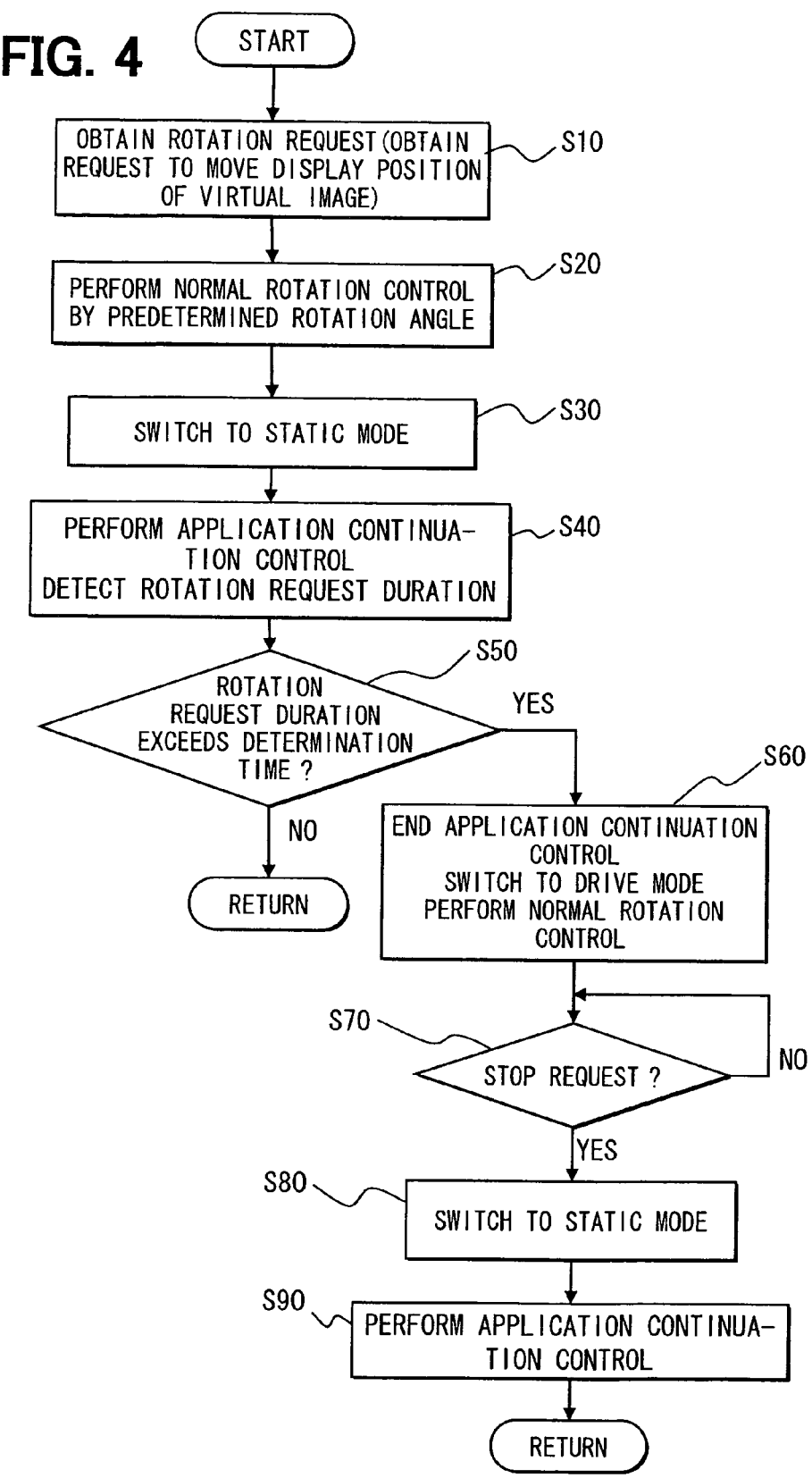
FIG. 4 is a flow chart illustrating a control flow for drive controlling the stepping motor in accordance with the first embodiment.

A flow of drive signal control that the control circuit 82 performs through the execution of a computer program will be described in detail in reference to FIGS. 4 to 6. The drive signal control flow in FIG. 4 is started when an engine switch of the vehicle is put into an ON state, and the control flow is ended when the engine switch is put into an OFF state.

At S10, it is obtained whether rotation of the magnet rotor 60 for moving the display position of the virtual image 100 is requested based on the upward command signal or downward command signal from the operating switch 70. As long as neither the upward command signal nor downward command signal is obtained, application of the drive signal to the exciting coils 54a, 54b of respective phases A, B remains stopped. If either one of the command signals is obtained, it is considered that the driver requests (rotation request) rotation of the concave mirror 32, i.e., rotation of the magnet rotor 60, and control proceeds to S20.

Turning "ON" of the operating switch 70 illustrated in FIGS. 5 and 6 indicates a state in which the upward command signal or the downward command signal is being outputted, i.e., the rotation request for the magnet rotor 60 by the driver. Turning "OFF" of the switch 70 indicates a state in which the output of the upward or downward command signal is stopped, i.e., a stop request for the magnet rotor 60 by the driver.

At S20, in accordance with the command signal obtained at S10, an operation mode of the stepping motor 50 is switched to the drive mode to rotate the magnet rotor 60 by a predetermined rotation angle, and control proceeds to S30. At S30, upon switching of the operation mode to the drive mode, normal rotation control is executed, i.e., the drive signal is applied by turns to the exciting coils 54a, 54b of respective phases such that their amplitudes periodically change as illustrated in FIG. 5 or 6 to produce a rotating magnetic field in the exciting coils 54a, 54b. Because of the generated rotating magnetic field, the magnet rotor 60 rotates by the predetermined rotation angle. After the magnet rotor 60 is rotated by this rotation angle, the operation mode switches to a static mode.

At S40 following S30, with the amplitude of the drive signal at the rotation angle of the magnet rotor 60 at the time of switching of the operation mode to the static mode at S30 being maintained, application continuation control that continues application of this drive signal for a predetermined time is performed. In the present embodiment, as illustrated in FIGS. 5 and 6, the period during which the application is continued is, in principle, a period obtained as a result of deducting an operating time of the drive mode at S30 from a determination time. This application continuation time may exceed the time obtained by deducting the operating time of the drive mode from the determination time. The determination time will be described in greater detail hereinafter.

At the same time, a duration of the rotation request for the magnet rotor 60 is detected at S40. The duration of the rotation request may be detected using a duration of the upward command signal or downward command signal of the operating switch 70. In the present embodiment, by obtaining disconnection of the upward command signal or downward command signal, the control circuit 82 determines that the rotation request is ended. When the control circuit 82 detects the stop of output of the upward command signal or downward command signal, it is considered that the driver requests (stop request) that the rotation of the magnet rotor 60 be stopped.

At S50 following S40, it is determined whether the duration of the rotation request detected at S40 exceeds a predetermined determination time (1 sec in the present embodiment). If negative determination is made at S50, control returns to S10 without switching the operation mode to the drive mode even if the operating switch 70 is momentarily (for a short time) pressed any more.

To momentarily press the operating switch 70 is one of modes of operation performed by the driver. In the present embodiment, a depression period of the operating switch 70, and a moving distance of the display position of the virtual image 100 are related to each other. As the depression period of the operating switch 70 becomes shorter, the moving distance of the display position of the virtual image 100 is made shorter. As a result, movement of the display position of the virtual image 100 can be in accordance with the driver's feeling.

Patterns of the drive signal in a case in which the operating switch 70 is momentarily pressed and the duration of the rotation request is determined to be shorter than the determination time will be described with reference to a timing diagram in FIG. 5. FIG. 5 illustrates a case in which the duration of the rotation request is shorter than the determination time; and the rotation request (depression of the operating switch 70) is made again within the determination time.

Upon obtaining the rotation request, the control circuit 82 switches temporarily to the drive mode to rotate the magnet rotor 60 by a predetermined angle. As in FIG. 5, the control circuit 82 performs the normal rotation control for applying by turns the drive signal to the exciting coils 54a, 54b. After the rotation of the magnet rotor 60 by the predetermined angle, the control circuit 82 switches the operation mode to the static mode. When the operation mode is switched to the static mode, the control circuit 82 performs the application continuation control to continue the application of the drive signal for a predetermined time as in FIG. 5, with the amplitude of the drive signal at the rotation angle of the magnet rotor 60 at the time the operation mode is switched to the static mode being maintained.

When the drive signal is applied to the exciting coils 54a, 54b with the amplitude of the drive signal maintained, the electrical angle is maintained. While the drive signal is being applied, the magnet rotor 60 is maintained at the mechanical angle at this electrical angle.

At the same time, the control circuit 82 detects the duration of the rotation request. In this example illustrated in FIG. 5, the control circuit 82 determines that the operating switch 70 is momentarily pressed since this duration of the rotation request is shorter than the determination time. After the rotation of the magnet rotor 60 by the predetermined angle, the control circuit 82 switches the operation mode to the static mode, and performs the application continuation control.

As shown in FIG. 5, when the operating switch 70 is momentarily pressed again before the determination time elapses after the first drive mode is started, and the control circuit 82 obtains the rotation request, the application continuation control, which is being performed, is stopped. Then, the control circuit 82 switches the operation mode to the drive mode again, and performs the normal rotation control to rotate the magnet rotor 60 by the predetermined angle.

Furthermore, similar to the above-described procedures, the control circuit 82 switches the operation mode to the static mode after the rotation of the magnet rotor 60 by the predetermined angle. When the operation mode is switched to the static mode, as in FIG. 5, the control circuit 82 performs the application continuation control similar to the previous switching to the static mode. If no subsequent rotation request is made before the determination time elapses as illustrated in FIG. 6, the application continuation control is continued until a predetermined time elapses.

After the application continuation control is continued for a predetermined time, the control circuit 82 stops all the applications of the drive signals to the exciting coils 54a, 54b to put the coils 54a, 54b into the non-magnetized state. As described above, if the momentary pressing operation on the operating switch 70 is carried out more than once for a short time, the processings at S10 to S50 in the control flow are repeatedly performed.

As a result of this drive pattern of the drive signal in FIG. 5, in a state in which an interval between the driver's rotation request and subsequent rotation request is short and the driver's awareness of the display state of the virtual image 100 is thereby increased, production tolerance of components of the stepping motor 50 or unprepared rotation of the magnet rotor 60 due to the urging force of the spring member 42, which is produced between the rotation request and the subsequent rotation request, can be limited. Therefore, the generation of vibration of the virtual image 100 when the display position is changed can be curbed.

In this embodiment, the next rotation request is obtained in the midst of the application continuation control; and if the need for the magnet rotor 60 to be rotated by the predetermined angle arises, the control circuit 82 executes the normal rotation control after stopping the application continuation control, which is performed. Accordingly, control in accordance with the driver's rotation request can be achieved. Moreover, the control circuit 82 stops the application continuation control, and then, the following normal rotation control is performed. Accordingly, collision of the controls is avoidable. As a result, malrotation of the magnet rotor 60 due to the collision control is limited.

The description will be resumed from S50 in the control flow illustrated in FIG. 4. If it is determined at S50 that the duration of the rotation request detected at S40 is longer than the determination time, control proceeds to S60. As a result, the operation of the operating switch 70 is regarded as lengthy (for a long time) pressing operation. It is thus determined that the driver intends to greatly move the display position of the virtual image 100.

At S60, the operation mode, which has been put temporarily into the static mode, is switched to the drive mode again, and the application continuation control, which is being executed, is ended. Then, the normal rotation control is performed to rotate the magnet rotor 60 again.

At S70 following S60, it is determined whether the stop request for the operating switch 70 is detected. The stop request here is obtained when the driver operates the operating switch 70 with the intention of the stop of the rotation of the magnet rotor 60. In the present embodiment, the control circuit 82 obtains the stop request by obtaining no upward command signal or no downward command signal. If the stop request is not obtained at S60, the processing here is repeated until the stop request is obtained. If the stop request is obtained, control proceeds to S80.

At S80, the operation mode is switched to the static mode. At S90, with the amplitude of the drive signal at the rotation angle of the magnet rotor 60 at the time of switching of the operation mode to the static mode at S80 being maintained, the application continuation control that continues the application of the drive signal for a predetermined time is performed. After that, the application of the drive signals to the exciting coils 54a, 54b is stopped, and the exciting coils 54a, 54b are thereby put into the non-magnetized state. When the processing at S80 is ended, control returns to S10 again.

The patterns of the drive signal when the operating switch 70 is pressed for a long time, and it is determined that the duration of the rotation request exceeds the determination time will be explained in reference to a timing diagram in FIG. 6. Control corresponding to S40, i.e., the control until the first drive mode in FIG. 6 is ended is the same as the control described using FIG. 5, and therefore, its description is omitted here.

In the case of lengthy pressing of the operating switch 70 illustrated in FIG. 6, the duration of the rotation request is longer than the determination time. However, the control circuit 82 temporarily switches the operation mode to the static mode as illustrated in FIG. 6 even when the operating switch 70 is pressed for a long time. As described above, even in a state in which the operation mode is switched to the static mode, the rotation angle of the magnet rotor 60 at the time of switching to the static mode is maintained through the execution of the application continuation control by the control circuit 82 (S40). Accordingly, change of the rotational position of the magnet rotor 60 caused as a result of the coils being put into the non-magnetized state is limited. This application continuation control is continued until the duration of the rotation request exceeds the determination time.

As illustrated in FIG. 6, when the duration of the rotation request exceeds the determination time, the control circuit 82 switches the operation mode to the drive mode again, and 82 carries out the normal rotation control to rotate the magnet rotor 60. When the control circuit 82 obtains the stop request (state in which the upward command signal or downward command signal is not outputted), the control circuit 82 switches the operation mode to the static mode, and stops the normal rotation control to perform the application continuation control. Then, after continuation of the application continuation control for a predetermined time, the control circuit 82 stops all the applications of the drive signals to the exciting coils 54a, 54b to put the coils into the non-magnetized state.

As explained above, even in the case of the lengthy pressing operation of the operating switch 70, the application continuation control is performed in the period of the static mode during the lengthy pressing operation. Accordingly, the rotation angle of the magnet rotor 60 at the time of switching to the static mode is maintained.

Thus, even in the stepping motor 50 of the type of the operation mode being switched temporarily to the static mode during the lengthy pressing operation as illustrated in FIG. 6, unprepared rotation of the magnet rotor 60 at the time of switching from the first drive mode to the static mode and at the time of switching from the static mode to the subsequent drive mode is limited. Accordingly, the generation of vibration of the virtual image 100 at the time of change of the display position of the virtual image 100 is restrained.

Furthermore, as illustrated in FIGS. 5 and 6, in the present embodiment, when the control circuit 82 obtains the driver's rotation request, the control circuit 82 rotates the magnet rotor 60 by the predetermined rotation angle regardless of the operation state (momentary pressing operation or lengthy pressing operation) of the operating switch 70. Accordingly, the magnet rotor 60 is rotated before the determination of a degree of the driver's rotation request, and a response of the stepping motor 50 to the driver's rotation request is thereby improved.

In addition, as shown in FIGS. 5 and 6, when adjustment of the display position of the virtual image 100 through the driver's operation of the operating switch 70 is completed, the control circuit 82 switches the operation mode to the static mode to perform the application continuation control for a predetermined time. Then, the control circuit 82 switches the coils to the non-magnetized state. Upon switching from the magnetized state to the non-magnetized state, the magnet rotor 60 rotates only to the extent that the rotor 60 does not lose synchronism because of the structures of the stepping motor 50 and the concave mirror 32, and the virtual image 100 may thereby vibrate.

However, it is highly likely that the driver's consciousness will have been shifted to something different from the virtual image 100 by the time the change of the display position of the virtual image 100 is ended and the application continuation control is completed. Therefore, even if the virtual image 100 vibrates at the time of switching to the non-magnetized state, the influence (e.g., driver's sense of discomfort) of the vibration of the virtual image 100 upon the driver is reduced.

Second Embodiment

Figure 7:
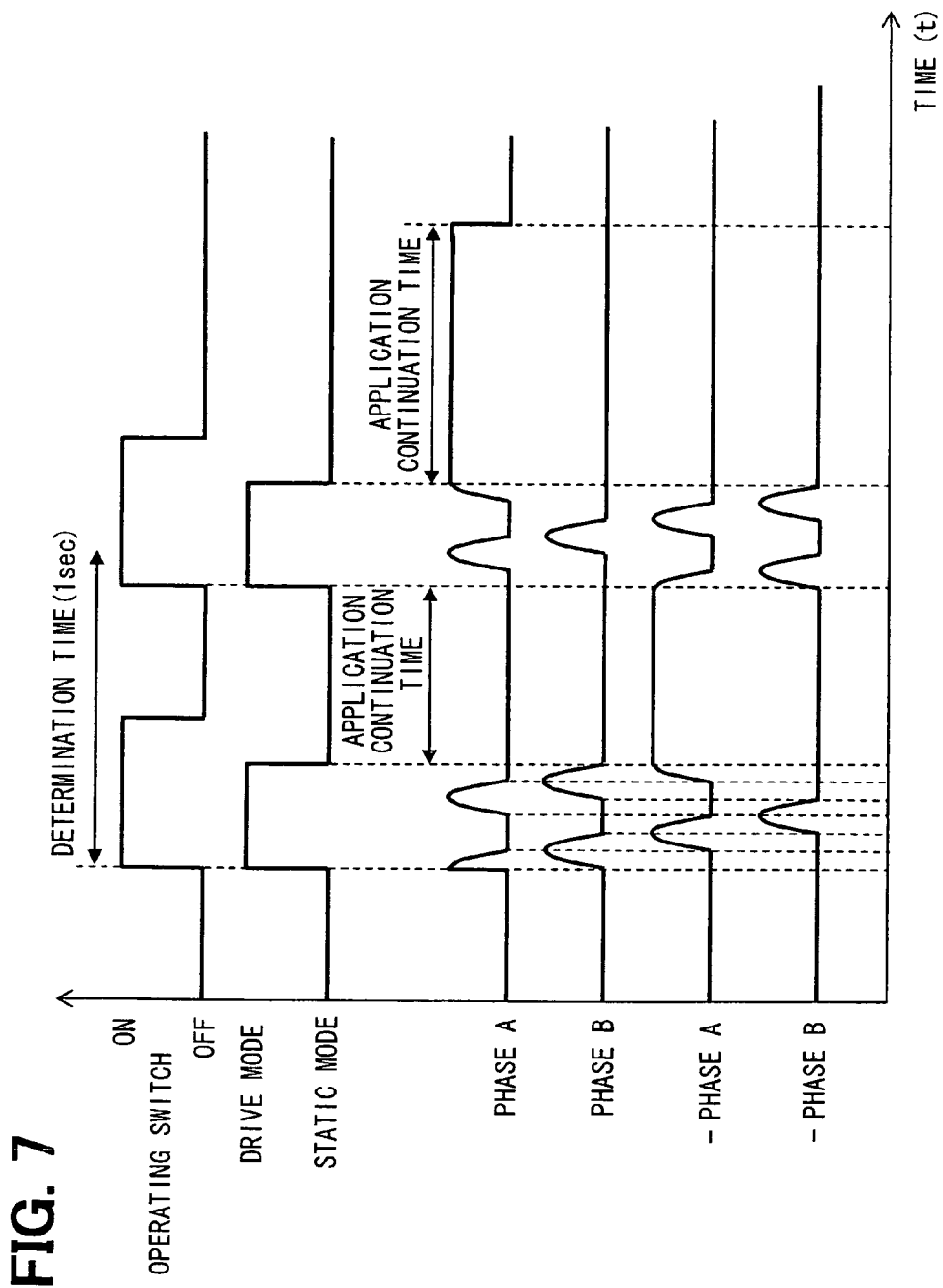
FIG. 7 is a timing diagram illustrating a drive pattern of a stepping motor when an operating switch in an HUD device in accordance with a second embodiment of the invention is momentarily pressed.
Figure 8:
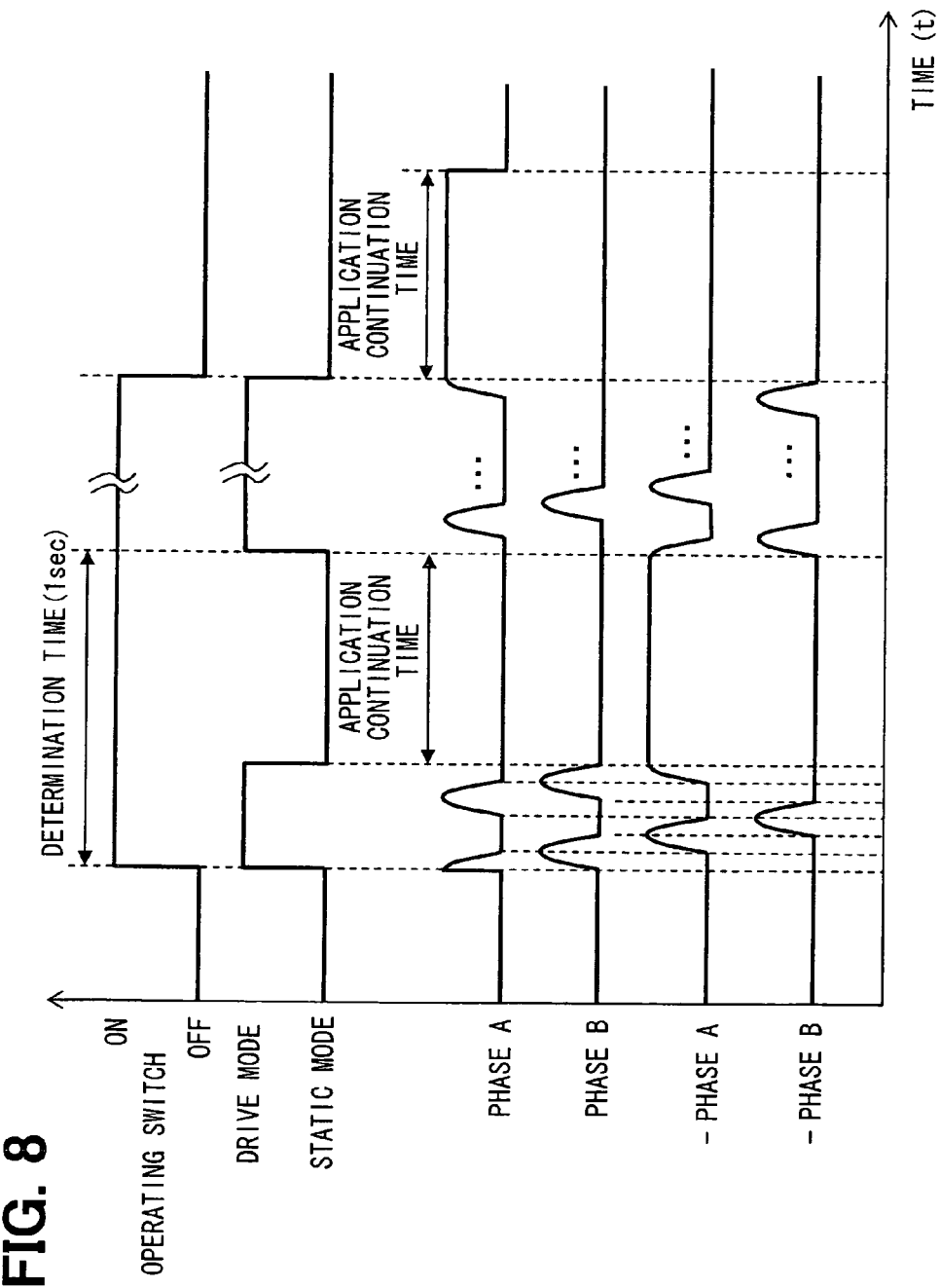
FIG. 8 is a timing diagram illustrating the drive pattern of the stepping motor when the operating switch in the HUD device in accordance with the second embodiment is pressed for a long time.

A second embodiment of the invention will be described below with reference to the accompanying drawings. The second embodiment is a modification of the first embodiment. FIGS. 7 and 8 respectively illustrate drive patterns at the time of momentary pressing operation of an operating switch 70 in the second embodiment and drive patterns at the time of lengthy pressing operation of the operating switch 70. The second embodiment will be explained below with its focus on different points from the first embodiment. The part of the second embodiment whose description will be omitted is substantially the same as the first embodiment.

In the second embodiment, a micro-step drive system is employed for a drive system of a stepping motor 50. The micro-step drive system is a drive system whereby a drive signal is changed from the present stabilizing point of the magnet rotor 60 to the following electrical angle that is a predetermined angle, which is smaller than an interval from the present stabilizing point of a magnet rotor 60 to its adjacent next stabilizing point, away. In the micro-step drive system, as shown in FIGS. 7 and 8, the drive signals applied to exciting coils 54a, 54b of respective phases are sine half waves. If phases of amplitudes of two drive signals in the shape of the sine half wave are shifted from each other by 90 degrees by the electrical angle, the other sine half wave is the smallest when the amplitude of one sine half wave is the greatest. As described above, as a result of the application of drive signals in the shape of the sine half wave to the exciting coils 54a, 54b of respective phases, the magnet rotor 60 is made static between the present stabilizing point and its adjacent stabilizing point.

As above, in the micro-step drive system, the magnet rotor 60 is made static between two stabilizing points. In the present embodiment, a control circuit 82 sets the stabilizing point as a target rotation angle for the magnet rotor 60, and controls application of the drive signal to the exciting coils 54a, 54b. Therefore, switching from a drive mode to a static mode and switching from the static mode to the drive mode are carried out when the magnet rotor 60 reaches the stabilizing point.

FIGS. 7 and 8 are the same as FIGS. 5 and 6 except for the forms of the drive signals supplied to the exciting coils 54a, 54b. In this embodiment as well, a control flow performed by the control circuit 82 is the same as the flow illustrated in FIG. 4. Accordingly, as a result of the present embodiment as well, even in a case where the momentary pressing operation of the operating switch 70 is continuously performed, or in a case where the lengthy pressing operation of the switch 70 is performed, the coils being put into the non-magnetized state in the static mode in the middle of the operation is limited. Thus, in the present embodiment as well, unprepared rotation of the magnet rotor 60 is restrained, and generation of vibration of a virtual image 100 is thereby curbed.

In the invention, the control part sets the stabilizing point at which the detent torque becomes the greatest at the target rotation angle for the magnet rotor, and the control part performs the normal rotation control that controls the amplitude of the drive signal so as to rotate the magnet rotor to the target rotation angle. Accordingly, even though the application of the drive signal to the coil is stopped after the magnet rotor is rotated to the target rotation angle, the magnet rotor is maintained at the stabilizing point because of the effect of detent torque. As a result, the drive signal does not need to be applied to the coil constantly while the HUD device is in operation, and waste of the consumed electric power of the stepping motor is thereby limited.

In the invention, the control part performs the normal rotation control, and when the magnet rotor rotates to the target rotation angle, the control part performs the application continuation control that continues the application of the drive signal for a predetermined period with the amplitude of the drive signal at the target rotation angle maintained. As a result of such application continuation control by the control part, the magnet rotor can be maintained at the target rotation angle for the predetermined period after the magnet rotor reaches the target rotation angle. Accordingly, generation of vibration of the virtual image can be, curbed for the predetermined period after the stop of the rotation of the stepping motor. Thus, owing to the application continuation control of the invention, as long as the user's (driver's) consciousness of the display state of the virtual image is comparatively high, the generation of vibration of the virtual image is inhibited, so that creation of a sense of discomfort for the user can be limited as much as possible.

In the invention, if a need for the rotation of the magnet rotor to the subsequent target rotation angle arises in the course of the execution of application continuation control, the control part stops the presently-performing application continuation control. Accordingly, the magnet rotor can be made to rotate immediately toward the next target rotation angle. The control part performs the normal rotation control to rotate the magnet rotor to the following target rotation angle after the stop of the application continuation control. As a result, after the stop of the presently-performing application continuation control, the normal rotation control is performed toward the following target rotation angle. Therefore, malrotation due to the collision between the application continuation control and normal rotation control is limited.

Modifications of the above embodiments will be described. The embodiments of the present invention have been described above. The present invention is not interpreted exclusively within the above embodiments, and it may be applied to various embodiments without departing from the scope of the invention.

For example, in the first embodiment, the stepping motor 50 is rotated by the two-phase excitation method. Alternatively, a single-phase excitation method may be employed or a 1-2 phase-excitation method may be used. In the case of employment of the 1-2 phase excitation method, when the control circuit 82 switches the operation mode to the static mode, the control circuit 82 controls the drive signal to switch at the time the magnet rotor 60 reaches the stabilizing point.

Additionally, the operating switch 70 in the first and second embodiments is an ON-OFF switch. The control circuit 82 determines that the rotation request is made by obtaining the upward command signal or downward command signal, which is outputted from the switch through the depression of the operating switch 70 by the driver. As a result of the depression state of the operating switch 70 being canceled and the output of the command signal being no longer detected, the control circuit 82 determines that the stop request operation is performed. The rotation request and stop request are not limited to the above embodiments. For instance, separately from the output of the upward or downward command signal, there may be an operating switch that can output a command signal for a stop.

Additional advantages and modifications will readily occur to those skilled in the art. The invention in its broader terms is therefore not limited to the specific details, representative apparatus, and illustrative examples shown and described.

What is claimed is:

1. A head up display device for a vehicle, comprising:
 a display configured to display an image;
 a reflective member that is disposed rotatably relative to the display and configured to reflect the image displayed by the display and to project the image onto a projection member of the vehicle, thereby displaying a virtual image of vehicle-related information;
 a stepping motor configured to rotate the reflective member so as to adjust a display position of the virtual image, wherein:
  the stepping motor includes a coil, a stator, and a magnet rotor accommodated rotatably in the stator;
  the magnet rotor is rotated as a result of application of a drive signal, whose amplitude periodically changes, to the coil;
  the reflective member is rotated by the rotated magnet rotor; and
  a stabilization point, at which detent torque of the stepping motor is maximized, is defined as a target rotation angle of the magnet rotor;
 an operating switch configured to output an upward command signal or a downward command signal that indicates a request for the rotation of the magnet rotor; and
 a control part that is configured to control the drive signal to the coil based on the command signal inputted from the operating switch and that includes:
  an obtaining unit configured to obtain whether the rotation of the magnet rotor is requested based on the upward command signal or the downward command signal from the operating switch;
  a first drive mode unit configured to perform normal rotation control that controls the amplitude of the drive signal to rotate the magnet rotor to the target rotation angle so as to rotate the magnet rotor by a predetermined rotation angle in accordance with the command signal obtained by the obtaining unit;

a first performance unit configured to perform application continuation control that continues the application of the drive signal for a predetermined period, with the amplitude of the drive signal at the target rotation angle being maintained, after the first drive mode unit performs the normal rotation control to rotate the magnet rotor to the target rotation angle, and then configured to put the coil into a non-magnetized state;

a determination unit configured to determine whether a duration of the request for the rotation of the magnet rotor exceeds a predetermined determination time, wherein the determination unit determines that the operating switch is momentarily pressed when the duration of the request for the rotation is shorter than the determination time and determines that the operating switch is pressed for a long time when the duration of the request for the rotation is longer than the determination time;

an ending unit configured to end the application continuation control and perform the normal rotation control so as to rotate the magnet rotor again when the duration of the request for the rotation is longer than the determination time;

an obtaining unit configured to obtain a request to stop the rotation of the magnet rotor by obtaining no upward command signal or no downward command signal; and a second performance unit configured to perform the application continuation control and then to put the coil into the non-magnetized state when the request to stop the rotation is obtained, wherein when the request for the rotation is obtained again before the determination time elapses so that the magnet rotor needs to be rotated to a subsequent target rotation angle of the magnet rotor during the application continuation control, the control part stops the application continuation control and then performs the normal rotation control to rotate the magnet rotor to the subsequent target rotation angle by the first drive mode unit.

* * * * *